US009374705B2

(12) United States Patent
Cheng et al.

(10) Patent No.: US 9,374,705 B2
(45) Date of Patent: Jun. 21, 2016

(54) METHODS, DEVICES AND SYSTEM FOR VERIFYING MOBILE EQUIPMENT

(75) Inventors: Xiaofeng Cheng, Shenzhen (CN); Bo Song, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/397,956

(22) PCT Filed: Jul. 11, 2012

(86) PCT No.: PCT/CN2012/078485
§ 371 (c)(1),
(2), (4) Date: Oct. 31, 2014

(87) PCT Pub. No.: WO2013/163846
PCT Pub. Date: Nov. 7, 2013

(65) Prior Publication Data
US 2015/0181421 A1    Jun. 25, 2015

(30) Foreign Application Priority Data
May 3, 2012  (CN) .......................... 2012 1 0134713

(51) Int. Cl.
*H04W 12/04* (2009.01)
*H04W 12/06* (2009.01)
(Continued)

(52) U.S. Cl.
CPC ........... *H04W 12/04* (2013.01); *H04L 63/0807* (2013.01); *H04L 63/101* (2013.01); *H04W 12/06* (2013.01); *H04W 12/08* (2013.01); *H04W 76/02* (2013.01); *H04W 84/18* (2013.01)

(58) Field of Classification Search
CPC ..... H04W 12/04; H04W 76/02; H04W 12/08; H04W 12/06; H04W 84/18; H04L 63/0807; H04L 63/101
See application file for complete search history.

(56) References Cited

U.S. PATENT DOCUMENTS

2006/0221919 A1* 10/2006 McRae ................. H04W 48/16
370/338
2009/0158394 A1    6/2009 Oh
(Continued)

FOREIGN PATENT DOCUMENTS

CN    1567875 A    1/2005
CN    1674496 A    9/2005
(Continued)

OTHER PUBLICATIONS

International Search Report in international application No. PCT/CN2012/078485, mailed on Feb. 7, 2013.
(Continued)

Primary Examiner — Nathan Mitchell
(74) Attorney, Agent, or Firm — Oppedahl Patent Law Firm LLC

(57) ABSTRACT

Disclosed is a method for verifying Mobile Equipment (ME), which includes that: an Ad Hoc hotspot, after determining that the ME transmitting equipment information is legal equipment, transmits corresponding ME information generated according to the equipment information to operating company database equipment, and receives verification key information returned by the operating company database equipment; and the Ad Hoc hotspot, after receiving a key verification request from the ME, verifies the ME by utilizing the corresponding verification key information, notifies the ME that the ME passes the verification if the ME passes the verification, and establishes a connection with the ME. The disclosure also discloses devices and a system for verifying the ME. By the disclosure, the Ad Hoc hotspot can provide different service for ME of different telecommunication operating companies, the quality of service of the Ad Hoc hotspot provided by the telecommunication operating company for its own customers using ME is ensured, and an Average Revenue Per User (ARPU) of the telecommunication operating company is further ensured.

15 Claims, 3 Drawing Sheets

(51) Int. Cl.
*H04L 29/06* (2006.01)
*H04W 12/08* (2009.01)
*H04W 76/02* (2009.01)
*H04W 84/18* (2009.01)

(56) References Cited

U.S. PATENT DOCUMENTS

| | | |
|---|---|---|
| 2010/0046486 A1 | 2/2010 | Maruyama |
| 2010/0070760 A1* | 3/2010 | Vanderveen ........ H04L 63/0823 713/156 |
| 2010/0080202 A1* | 4/2010 | Hanson ............... H04L 63/0853 370/338 |
| 2011/0258236 A1 | 10/2011 | Iyer |
| 2013/0100857 A1 | 4/2013 | Iyer |
| 2014/0310782 A1 | 10/2014 | Vanderveen |

FOREIGN PATENT DOCUMENTS

| | | |
|---|---|---|
| CN | 1764107 A | 4/2006 |
| CN | 1871819 A | 11/2006 |
| CN | 102209324 A | 10/2011 |
| JP | 2003348660 A | 12/2003 |
| JP | 2005110112 A | 4/2005 |
| JP | 2008066969 A | 3/2008 |
| JP | 2012502587 A | 1/2012 |

OTHER PUBLICATIONS

English Translation of the Written Opinion of the International Search Authority in international application No. PCT/CN20121078485, mailed on Feb. 7, 2013.
Authentication, Authorization and Accounting (AAA) in Hybrid Ad hoc Hotspot's Environments, Sep. 29, 2006.
Supplementary European Search Report in European application No. 12876068.3, mailed on Mar. 19, 2015.

* cited by examiner

METHODS, DEVICES AND SYSTEM FOR VERIFYING MOBILE EQUIPMENT

TECHNICAL FIELD

The disclosure relates to a key verification technology for an Ad Hoc network, in particular to a method, device and system for verifying Mobile Equipment (ME).

BACKGROUND

The Ad Hoc network is a multi-hop, centerless and self-organized wireless network, and is also called a multi-hop network, an infrastructure-less network or a self-organized network. The Ad Hoc network is free of fixed infrastructures, and each node is mobile, and can dynamically keep in touch with other nodes in any manner. In the Ad Hoc network, due to a limitation of a wireless coverage of ME, when two pieces of ME cannot directly communicate, packet forwarding by virtue of other nodes is allowed.

At present, there are mainly two modes for connection establishment between two pieces of ME in the Ad Hoc network: one is to directly establish a connection without setting a key for verification in both pieces of ME, or to establish the connection through an Ad Hoc hotspot in a packet forwarding way; and the other is to set a fixed key and a verification mode in the Ad Hoc hotspot by one piece of ME, verify the fixed key in the Ad Hoc hotspot by the other ME and establish the connection between the two pieces of ME by virtue of the Ad Hoc hotspot as a router after a connection with the Ad Hoc hotspot is established.

However, in the two modes for the connection establishment, when the ME establishes the connection with the Ad Hoc hotspot, the key is not set, or only the fixed key is set, so that when there are users of different telecommunication operating companies in the same region, if there is only the Ad Hoc hotspot provided by one telecommunication operating company in this region, the Ad Hoc hotspot simultaneously provides service for ME of multiple telecommunication operating companies due to the fact that the key is not set for the Ad Hoc hotspot or only the fixed key which can be extremely easily acquired by all the users is set, and the ME of the other telecommunication operating companies pre-empt service resources to cause influence on the quality of service of the Ad Hoc hotspot over the ME used by its own customers and further probably reduce an Average Revenue Per User (ARPU) of the telecommunication operating company to which the Ad Hoc hotspot belongs due to the fact that the Ad Hoc hotspot cannot provide different service for the ME of different telecommunication operating companies.

It can be seen that according to a conventional method for the connection establishment between the ME and the Ad Hoc hotspot, the key is not set or only the fixed key is set, which leads to the incapability of the Ad Hoc hotspot in providing different service for the ME of different telecommunication operating companies and results in the pre-empting of the ME of the other telecommunication operating companies over service resources of the telecommunication operating company to which the Ad Hoc hotspot belongs, thereby affecting the quality of service of the Ad Hoc hotspot over its own users and further probably reducing the ARPU of the telecommunication operating company to which the Ad Hoc hotspot belongs.

SUMMARY

To this end, the disclosure provides methods, devices and a system for verifying ME, which enable an Ad Hoc hotspot to provide different service for ME of different telecommunication operating companies, thereby ensuring the quality of service of the Ad Hoc hotspot provided by the telecommunication operating company for its own customers using the ME and further ensuring an ARPU of the telecommunication operating company.

In order to achieve the purpose, the technical scheme of the disclosure is implemented as follows.

The disclosure provides a method for verifying ME, the method including that:

an Ad Hoc hotspot, after determining that ME transmitting equipment information is legal equipment, transmits corresponding ME information generated according to the equipment information to operating company database equipment, and receives verification key information returned by the operating company database equipment; and the Ad Hoc hotspot, after receiving a key verification request from the ME, verifies the ME by utilizing the corresponding verification key information, notifies the ME that the ME passes the verification if the ME passes the verification, and establishes a connection with the ME.

In the scheme, the step of the Ad Hoc hotspot determining that the ME transmitting the equipment information is legal equipment may include that: the Ad Hoc extracts an operating company logo and/or a manufacturer code from the equipment information as critical information, checks whether the critical information is the same as an operating company logo and/or a manufacturer code which are/is stored by the Ad Hoc hotspot, determines that the ME is legal equipment if the critical information is the same as the operating company logo and/or the manufacturer code which are/is stored by the Ad Hoc hotspot, and if the critical information is different from the operating company logo and/or the manufacturer code which are/is stored by the Ad Hoc hotspot, determines that the corresponding ME is illegal equipment.

In the scheme, after the Ad Hoc hotspot transmits the corresponding ME information generated according to the equipment information to the operating company database equipment, the method further may include that: the operating company database equipment generates key information and the verification key information according to the ME information transmitted by the Ad Hoc hotspot, transmits the key information to the ME and transmits the verification key information to the Ad Hoc hotspot.

In the scheme, after the operating company database equipment transmits the key information to the ME, the method further may include that: the ME receives the key information from the operating company database equipment, acquires a key from the key information, compiles the key and own equipment information into the key verification request and transmits the key verification request to the Ad Hoc hotspot; and if the ME receives a notice indicating that the ME passes the verification from the Ad Hoc hotspot, the ME establishes the connection with the Ad Hoc hotspot.

In the scheme, the step that the Ad Hoc hotspot verifies the ME by utilizing the corresponding verification key information includes that: the Ad Hoc hotspot compares the key in the key verification request transmitted by the ME with the verification key information stored by the Ad Hoc hotspot, determines that the ME passes the verification if the key in the key verification request is the same as the verification key information stored by the Ad Hoc hotspot, otherwise determines that the ME does not pass the verification.

The disclosure provides a method for verifying ME, the method includes that:

the ME receives key information from operating company database equipment, acquires a key from the key information, compiles the key and equipment information of the ME into a key verification request, and transmits the key verification request to an Ad Hoc hotspot; and if the ME receives a notice indicating that the ME passes verification from the Ad Hoc hotspot, the ME establishes a connection with the Ad Hoc hotspot.

In the scheme, before the ME receives the key information from the operating company database equipment, the method further may include that: the ME transmits the equipment information to the Ad Hoc hotspot, and the Ad Hoc hotspot, after determining that the ME transmitting the equipment information is legal equipment, transmits corresponding ME information generated according to the equipment information to the operating company database equipment and receives verification key information returned by the operating company database equipment.

In the scheme, after the Ad Hoc hotspot transmits the corresponding ME information generated according to the equipment information to the operating company database equipment, the method further may include that: the operating company database equipment generates the key information and the verification key information according to the ME information, transmits the key information to the ME and transmits the verification key information to the Ad Hoc hotspot.

In the scheme, after the ME transmits the key verification request to the Ad Hoc hotspot, the method further may include that: the Ad Hoc hotspot, after receiving the key verification request from the ME, verifies the ME by utilizing the corresponding verification key information, notifies the ME that the ME passes the verification if the ME passes the verification, and establishes the connection with the ME.

The disclosure provides a method for verifying ME, which includes that:

operating company database equipment generates key information and verification key information according to ME information transmitted by an Ad Hoc hotspot, transmits the key information to the ME and transmits the verification key information to the Ad Hoc hotspot.

In the scheme, before the operating company database equipment generates the key information and the verification key information according to the ME information transmitted by the Ad Hoc hotspot, the method further may include that: the Ad Hoc hotspot, after determining that the ME transmitting equipment information is legal equipment, transmits corresponding ME information generated according to the equipment information to the operating company database equipment.

In the scheme, after the operating company database equipment transmits the verification key information to the Ad Hoc hotspot, the method further may include that: after receiving a key verification request from the ME, the Ad Hoc hotspot verifies the ME by utilizing the corresponding verification key information, notifies the ME that the ME passes the verification if the ME passes the verification, and establishes a connection with the ME.

In the scheme, after the operating company database equipment transmits the key information to the ME, the method further may include that: the ME receives the key information from the operating company database equipment, acquires a key from the key information, compiles the key and the equipment information of the ME into the key verification request and transmits the key verification request to the Ad Hoc hotspot; and If the ME receives a notice indicating that the ME passes the verification from the Ad Hoc hotspot, the ME establishes the connection with the Ad Hoc hotspot.

The disclosure further provides a system for verifying ME, and the system includes an Ad Hoc hotspot and operating company database equipment, wherein the Ad Hoc hotspot is configured to, after determining that the ME transmitting equipment information is legal equipment, transmit corresponding ME information generated according to the equipment information to the operating company database equipment and receive verification key information returned by the operating company database equipment, and after receiving a key verification request from the ME, verify the ME by utilizing the corresponding verification key information, notify the ME that the ME passes the verification if the ME passes the verification and establish a connection with the ME; and the operating company database equipment is configured to generate key information and the verification key information according to the ME information transmitted by the Ad Hoc hotspot, transmit the key information to the ME and transmit the verification key information to the Ad Hoc hotspot.

In the scheme, the Ad Hoc hotspot is specifically configured to extract an operating company logo and/or a manufacturer code from the equipment information as critical information, check whether the critical information is the same as an operating company logo and/or a manufacturer code which are/is stored by the Ad Hoc hotspot, determine that the corresponding ME is legal equipment if the critical information is the same as the operating company logo and/or the manufacturer code which are/is stored by the Ad Hoc hotspot, and if the critical information is different from the operating company logo and/or the manufacturer code which are/is stored by the Ad Hoc hotspot, determine that the corresponding ME is illegal equipment.

In the scheme, the Ad Hoc hotspot is specifically configured to compare a key in the key verification request transmitted by the ME with the verification key information stored by the Ad Hoc hotspot, determine that the ME passes the verification if the key in the key verification request is the same as the verification key information stored by the Ad Hoc hotspot, otherwise determine that the ME does not pass the verification.

The disclosure further provides an Ad Hoc hotspot, which includes an information transmission module, an information receiving module, a key verification module and a connection management module, wherein the information transmission module is configured to, after determining that ME transmitting equipment information is legal equipment, transmit ME information to operating company database equipment;

the information receiving module is configured to transmit verification key information returned by the operating company database equipment to the key verification module, and after receiving a key verification request from the ME, transmit the key verification request to the key verification module;

the key verification module is configured to receive the verification key information from the information receiving module, verify the ME by utilizing the verification key information when receiving the key verification request from the information receiving module and transmit a verification result to the connection management module; and the connection management module is configured to, when receiving the verification result indicating that the ME passes the verification from the key verification module, establish a connection with the corresponding ME.

In the scheme, the Ad Hoc hotspot further may include a detection module, configured to judge whether the corresponding ME is legal equipment or not according to the equipment information transmitted by the information receiving module, and transmit a detection result to the information transmission module;

correspondingly, the information transmission module may be further configured to receive the detection result from the detection module.

The disclosure provides operating company database equipment, which includes a receiving module, a key generation module and a transmission module, wherein the receiving module is configured to, after receiving ME information from an Ad Hoc hotspot, transmit the ME information to the key generation module;

the key generation module is configured to generate key information and verification key information according to the ME information transmitted by the receiving module, and transmit the key information and the verification key information to the transmission module; and the transmission module is configured to receive the key information and the verification key information from the key generation module, transmit the key information to ME and transmit the verification key information to the Ad Hoc hotspot.

By the methods, the devices and the system for verifying the ME provided by the disclosure, the Ad Hoc hotspot can transmit the ME information corresponding to the legal ME to the operating company database equipment and receive the verification key information returned by the operating company database equipment; and after receiving the key verification request from the ME, the Ad Hoc hotspot verifies the ME by utilizing the corresponding verification key information, notifies the ME that the ME passes the verification if the ME passes the verification, and establishes a connection with the ME. Therefore, the Ad Hoc hotspot can provide different service for ME of different telecommunication operating companies, the quality of service of the Ad Hoc hotspot provided by the telecommunication operating company for its own customers using ME is ensured, and an ARPU of the telecommunication operating company is further ensured.

DETAILED DESCRIPTION

A basic thought of the disclosure is: an Ad Hoc hotspot, after determining that ME transmitting equipment information is legal equipment, transmits corresponding ME information generated according to the equipment information to operating company database equipment, and receives verification key information returned by the operating company database equipment; and after receiving a key verification request from the ME, the Ad Hoc hotspot verifies the ME by utilizing the corresponding verification key information, notifies the ME that the ME passes the verification if the ME passes the verification, and establishes a connection with the ME.

The disclosure is further described below with reference to the drawings and specific embodiments in detail.

Figure 1:
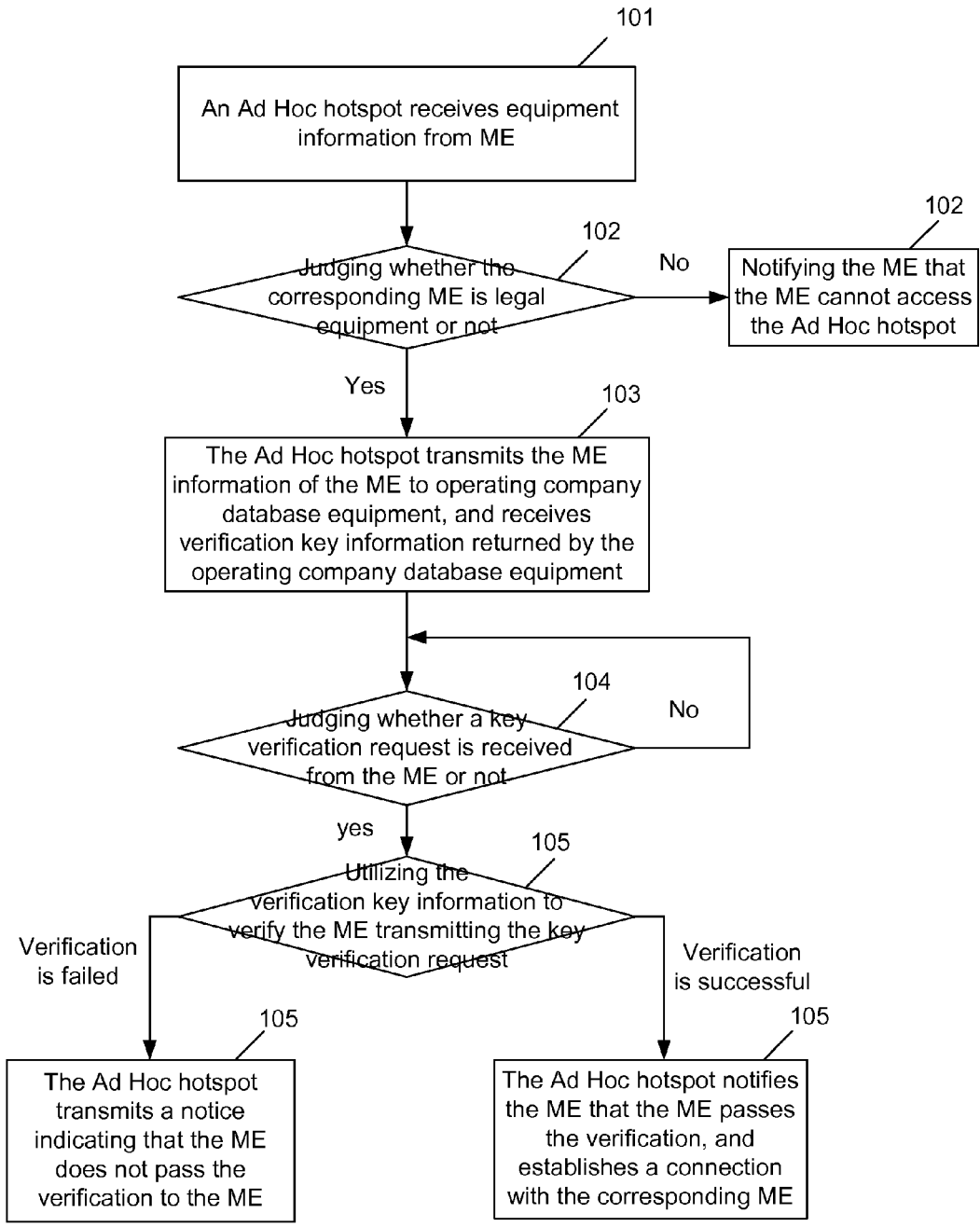
FIG. 1 is a flow diagram of a method for verifying ME according to the disclosure.

The disclosure provides a method for verifying ME, and as shown in FIG. 1, the method includes the following steps.

Step 101: an Ad Hoc hotspot receives equipment information from ME.

The equipment information here may include contents such as an International Mobile Subscriber Identification Number (IMSI), an International Mobile Equipment Identity (IMEI), a manufacturer code and an operating company logo; wherein the IMSI is acquired by the ME from a Subscriber Identity Module (SIM) card installed in the ME, and a method for acquiring the IMSI exists in the existing technology, and will not be repeated here.

Step 102: the Ad Hoc hotspot judges whether the corresponding ME is legal equipment or not according to the received equipment information; Step 103 is then executed if the corresponding ME is legal equipment, otherwise the ME is notified that the ME cannot access the Ad Hoc hotspot, and the processing flow is ended.

Here, judging whether the corresponding ME is legal equipment or not includes that: the Ad Hoc hotspot extracts the operating company logo and/or the manufacturer code from the equipment information as critical information, checks whether the critical information is the same as an operating company logo and/or a manufacturer code, which are/is stored by the Ad Hoc hotspot, or not, determines that the corresponding ME is legal equipment if the critical information is the same as the operating company logo and/or the manufacturer code, which are/is stored by the Ad Hoc hotspot, and if the critical information is different from the operating company logo and/or the manufacturer code, which are/is stored by the Ad Hoc hotspot, determines that the corresponding ME is illegal equipment, the contents required to be included in the critical information may also be set by a telecommunication operating company according to actual conditions, for example, one or more of the IMSI, the manufacturer code, the IMEI, the operating company logo information and a mobile phone number in the equipment information may be extracted as the critical information.

Step 103: the Ad Hoc hotspot transmits the ME information of the ME to the operating company database equipment, and receives verification key information returned by the operating company database equipment.

Here, the ME information is information consisting of the IMSI, the manufacturer code and the mobile phone number, which are extracted from the equipment information; and the operating company database equipment is network equipment storing an operating company database.

The verification key information includes a verification key and the IMSI, and may also include one or more of a traffic control strategy, an ME downloading traffic rate, a downloading type and one or more of service types; wherein the verification key is preset according to actual conditions by the telecommunication operating company, and can be modified according to actual needs.

After the Ad Hoc hotspot transmits the ME information to the operating company database equipment, Step 103 further may include that: the operating company database equipment generates key information and the verification key information according to the ME information, transmits the key information to the ME and transmits the verification key information to the Ad Hoc hotspot;

the key information may be random data generated by the operating company database equipment, and may also be a preset key; the key is preset according to actual conditions by the telecommunication operating company, and can be modified according to actual needs; and the key information is transmitted to the corresponding ME according to the IMSI or the mobile phone number in the ME information received from the Ad Hoc hotspot.

Step 104: the Ad Hoc hotspot judges whether a key verification request is received from the ME or not, Step 105 is then executed if the key verification request is received, otherwise Step 104 is repeated.

Here, the key verification request includes the key and the equipment information.

Step 105: the Ad Hoc hotspot utilizes the verification key information to verify the ME transmitting the key verification request, notifies the ME that the ME passes the verification if the ME passes the verification, establishes a connection with the corresponding ME and ends the processing flow, otherwise transmits a notice indicating that the ME does not pass the verification to the ME.

Here, the verification is implemented in a way that the Ad Hoc hotspot extracts the key and the equipment information from the key verification request, searches for the corresponding verification key information according to the IMSI in the equipment information, compares the found verification key information with the key in the key verification request, determines that the ME passes the verification if the found verification key information is the same as the key in the key verification request, otherwise determines that the ME does not pass the verification.

establishing a connection between the Ad Hoc hotspot and the corresponding ME includes that: the Ad Hoc hotspot extracts the equipment information from the key verification request, stores the equipment information and establishes the connection with the corresponding ME according to the equipment information; and a method for establishing the connection exists in the existing technology, and will not be repeated here.

In addition, before Step 101 is executed, the ME is required to start establishing a connection with another piece of ME according to an operation of a user, and transmits the equipment information to the corresponding Ad Hoc hotspot according to the existing technology; and after Step 103 is finished, the ME acquires the key from the received key information, and transmits the key verification request to the Ad Hoc hotspot by utilizing the key, and then Step 104 is executed.

The equipment information may be added by the ME into a Route Request (RREQ) message of a link layer and then transmitted to the Ad Hoc hotspot, or may also be added by the ME into a Transmission Control Protocol (TCP) message of a transport layer and then transmitted to the Ad Hoc hotspot, or may also be added by the ME into an application related message of an application layer and then transmitted to the Ad Hoc hotspot; the adoption of a transmission mode may be set by the telecommunication operating company according to actual conditions; the RREQ message, the TCP message and the application related message are messages specified in the existing technology, and will not be repeated here.

Transmitting the key verification request to the Ad Hoc hotspot by utilizing the key is as follows: when the key information is random data, the ME generates a key according to an encryption algorithm by utilizing the random data in the key information, compiles the key and the equipment information of the ME into the key verification request; when the key information is a preset key, the ME directly extracts the key, and compiles the key and the equipment information of the ME into the key verification request; wherein the encryption algorithm may be preset according to actual conditions.

Figure 2:
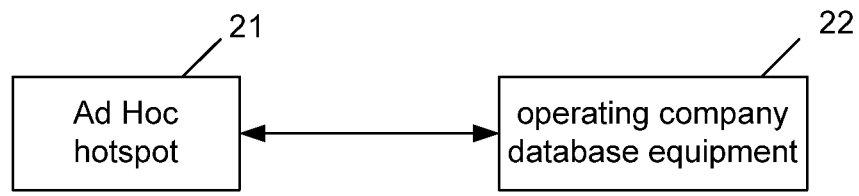
FIG. 2 is a structural diagram of a system for verifying ME according to the disclosure.

The disclosure discloses a system for verifying ME, and as shown in FIG. 2, the system includes an Ad Hoc hotspot 21 and operating company database equipment 22, wherein the Ad Hoc hotspot 21 is configured to, after determining that ME which transmits equipment information is legal equipment, transmit ME information to the operating company database equipment 22 and receive verification key information returned by the operating company database equipment 22, and after receiving a key verification request from the ME, verify the ME by utilizing the verification key information and establish a connection with the ME if the ME passes the verification; and the operating company database equipment 22 is configured to, after receiving the ME information from the Ad Hoc hotspot 21, transmit key information to the ME and transmit the verification key information to the Ad Hoc hotspot 21.

The Ad Hoc hotspot 21 is specifically configured to judge whether the corresponding ME is legal equipment or not according to the equipment information, transmit the ME information to the operating company database equipment 22 if the corresponding ME is legal equipment and otherwise notify the ME that the ME cannot access the Ad Hoc hotspot 21.

The Ad Hoc hotspot 21 is specifically configured to extract an operating company logo and/or a manufacturer code from the equipment information as critical information, check whether the critical information is the same as an operating company logo and/or a manufacturer code, which are/is stored by the Ad Hoc hotspot, or not, determine that the corresponding ME is legal equipment if the critical information is the same as the operating company logo and/or the manufacturer code, which are/is stored by the Ad Hoc hotspot, and if the critical information is different from the operating company logo and/or the manufacturer code, which are/is stored by the Ad Hoc hotspot, determine that the corresponding ME is illegal equipment.

The Ad Hoc hotspot 21 is also configured to extract an IMSI, the manufacturer code and a mobile phone number from the equipment information to form the ME information.

The operating company database equipment 22 is network equipment storing an operating company database.

The operating company database equipment 22 is specifically configured to generate random data to form the key information, or use a preset key as the key information.

The operating company database equipment 22 is specifically configured to transmit the key information to the corresponding ME according to the IMSI or the mobile phone number in the ME information.

The Ad Hoc hotspot 21 is specifically configured to extract a key and equipment information from the key verification request, search for the corresponding verification key information according to the IMSI in the equipment information, compare the found verification key information with the key in the key verification request, determine that the ME passes the verification if the found verification key information is the same as the key in the key verification request and otherwise determine that the ME does not pass the verification.

Figure 3:
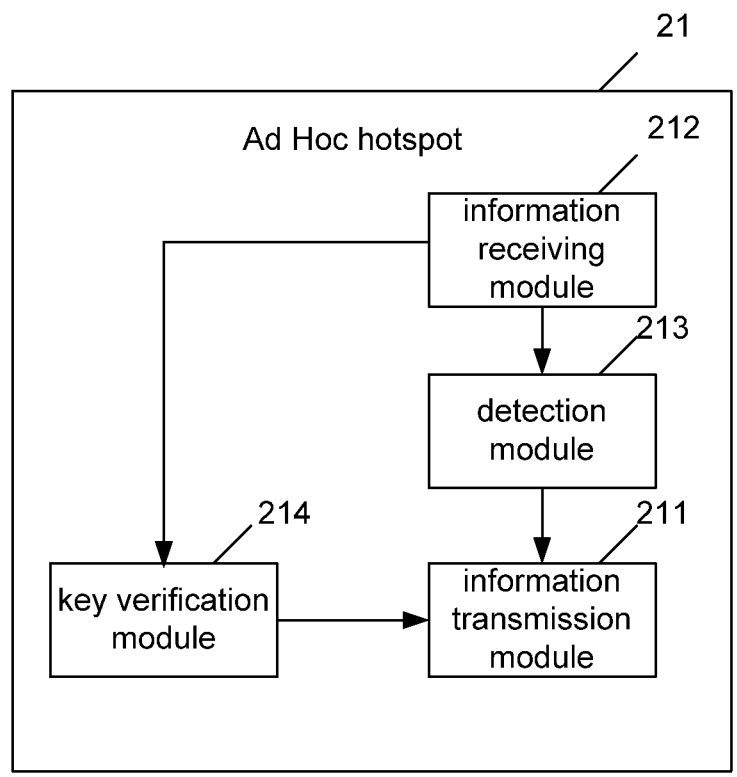
FIG. 3 is a structural diagram of an Ad Hoc hotspot according to the disclosure.

As shown in FIG. 3, the Ad Hoc hotspot 21 includes an information transmission module 211, an information receiving module 212 and a key verification module 213, wherein the information transmission module 211 is configured to, after determining that the ME transmitting the equipment information is legal equipment, transmit the ME information to the operating company database equipment, and when receiving a verification result indicating that the ME passes the verification from the key verification module 213, notify the ME that the ME passes the verification and establish a connection with the corresponding ME;

the information receiving module 212 is configured to transmit the verification key information returned by the operating company database equipment to the key verification module 213, and after receiving the key verification request from the ME, transmit the key verification request to the key verification module 213; and the key verification module 213 is configured to receive the verification key information from the information receiving module 212, verify the ME by utilizing the verification key information when receiving the key verification request from the information receiving module 212 and transmit the verification result to the information transmission module 211.

The Ad Hoc hotspot 21 also includes a detection module 214, configured to judge whether the corresponding ME is legal equipment or not according to the equipment information transmitted by the information receiving module 212, and transmit a detection result to the information transmission module 211; correspondingly, the information transmission module 211 is further configured to receive the detection result from the detection module 214, transmit the ME information to the operating company database equipment if determining that the ME transmitting the equipment information is legal equipment according to the detection result, otherwise notify the ME that the ME cannot access the Ad Hoc hotspot 21; and the information receiving module 212 is also configured to transmit the equipment information transmitted by the ME to the detection module 214.

The detection module 214 is specifically configured to extract the operating company logo and/or the manufacturer code from the equipment information as the critical information, check whether the critical information is the same as the operating company logo and/or the manufacturer code, which are/is stored by the Ad Hoc hotspot 21, or not, obtain a detection result indicating that the corresponding ME is legal equipment if the critical information is the same as the operating company logo and/or the manufacturer code, which are/is stored by the Ad Hoc hotspot, and if the critical information is different from the operating company logo and/or the manufacturer code, which are/is stored by the Ad Hoc hotspot, obtain a detection result indicating that the corresponding ME is illegal equipment.

The information transmission module 211 is specifically configured to extract the IMSI, the manufacturer code and the mobile phone number from the equipment information transmitted by the detection module 214 to form the ME information; and correspondingly, the detection module 214 is further configured to transmit the equipment information and the detection result to the information transmission module 211.

The key verification module 213 is specifically configured to extract the key and the equipment information from the key verification request, search for the corresponding verification key information according to the IMSI in the equipment information, compare the found verification key information with the key in the key verification request, obtain a verification result indicating that the ME passes the verification if the found verification key information is the same as the key in the key verification request and otherwise obtain a verification result indicating that the ME does not pass the verification.

Figure 4:
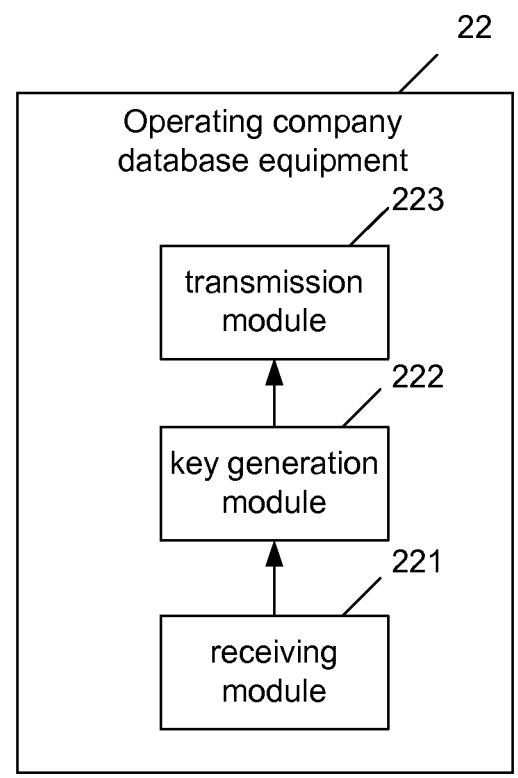
FIG. 4 is a structural diagram of operating company database equipment according to the disclosure.

As shown in FIG. 4, the operating company database equipment 22 includes a receiving module 221, a key generation module 222 and a transmission module 223, wherein the receiving module 221 is configured to, after receiving the ME information from the Ad Hoc hotspot, transmit the ME information to the key generation module 222;

the key generation module 222 is configured to generate key information and verification key information according to the ME information transmitted by the receiving module 221 and transmit the key information and the verification key information to the transmission module 223; and the transmission module 223 is configured to receive the key information and the verification key information from the key generation module 222, transmit the key information to ME and transmit the verification key information to the Ad Hoc hotspot.

The key generation module 222 is also configured to store the operating company database.

The key generation module 222 is specifically configured to generate random data to form key information or use a preset key as the key information.

The key generation module 222 is specifically configured to transmit the IMSI or the mobile phone number in the ME information, together with the key information, to the transmission module 223; and correspondingly, the transmission module 223 is specifically configured to transmit the key information to the corresponding ME according to the IMSI or the mobile phone number.

The above system for verifying ME may also include ME, configured to, after receiving the key from the key information, transmit the key verification request formed by the key and its own equipment information to the Ad Hoc hotspot and receive a connection establishment instruction from the Ad Hoc hotspot to establish the connection with the Ad Hoc hotspot or receive from the Ad Hoc hotspot a notice indicating that the ME does not pass the verification; and correspondingly, the Ad Hoc hotspot is specifically configured to, after receiving the key verification request from the ME, verify the ME by utilizing the key in the key verification request, transmit the connection establishment instruction to the ME and establish the connection with the ME if the ME passes the verification and otherwise transmit the notice indicating that the ME does not pass the verification to the ME.

The ME is specifically configured to, when the key information is random data, generate a key according to an encryption algorithm by utilizing the random data in the key information, and when the key information is a preset key, directly extract the key.

The ME is also configured to transmit the equipment information to the Ad Hoc hotspot, acquire the key from the key information according to the key information transmitted by the operating company database equipment, compile the key and the equipment information of the ME into a key verification request, transmit the key verification request to the Ad Hoc hotspot, and if receiving a notice indicating that the ME passes the verification from the Ad Hoc hotspot, establish a connection with the Ad Hoc hotspot.

The ME is specifically configured to acquire an IMSI from a SIM card installed in the ME, acquire contents such as a corresponding IMEI of its own, a manufacturer code and an operating company logo to form equipment information and add the equipment information into an RREQ message of a link layer and then transmit the equipment information to the Ad Hoc hotspot, or add the equipment information into a TCP message of a transport layer and then transmit the equipment information to the Ad Hoc hotspot, or add the equipment information into an application related message of an application layer and then transmit the equipment information to the Ad Hoc hotspot; and correspondingly, the Ad Hoc hotspot is specifically configured to extract the equipment information from the RREQ message, the TCP message or the application related message transmitted by the ME.

The above is only the embodiments of the disclosure and not intended to limit the scope of protection of the disclosure.

What is claimed is:

1. A method for verifying Mobile Equipment (ME), comprising:
   after an Ad Hoc hotspot determines that ME transmitting equipment information is legal equipment, generating, by the Ad Hoc hotspot, corresponding ME information according to the equipment information and transmitting the corresponding ME information to operating company database equipment, and receiving verification key information returned by the operating company database equipment; and
   after the Ad Hoc hotspot receives a key verification request from the ME, verifying, by the Ad Hoc hotspot, the ME by utilizing the verification key information, notifying the ME that the ME passes the verification if the ME passes the verification and establishing a connection with the ME;
   after transmitting the corresponding ME information generated according to the equipment information to the operating company database equipment, generating, by the operating company database equipment, key information and the verification key information according to the corresponding ME information transmitted by the Ad Hoc hotspot, transmitting the key information to the ME and transmitting the verification key information to the Ad Hoc hotspot.

2. The method according to claim 1, wherein determining, by the Ad Hoc hotspot, that the ME transmitting the equipment information is legal equipment comprises: extracting, by the Ad Hoc hotspot, an operating company logo and/or a manufacturer code from the equipment information as critical information, checking whether the critical information is the same as an operating company logo and/or a manufacturer code which are/is stored by the Ad Hoc hotspot, determining that the ME is legal equipment if the critical information is the same as the operating company logo and/or the manufacturer code which are/is stored by the Ad Hoc hotspot, and if the critical information is different from the operating company logo and/or the manufacturer code which are/is stored by the Ad Hoc hotspot, determining that the ME is illegal equipment.

3. The method according to claim 1, further comprising: after transmitting the key information to the ME, receiving, by the ME, the key information from the operating company database equipment, acquiring a key from the key information, compiling the key and the equipment information of the ME into the key verification request and transmitting the key verification request to the Ad Hoc hotspot; and
   if the ME receives a notice indicating that the ME passes the verification from the Ad Hoc hotspot, establishing, by the ME, the connection with the Ad Hoc hotspot.

4. The method according to claim 1, wherein verifying the ME by utilizing the verification key information comprises: comparing, by the Ad Hoc hotspot, a key in the key verification request transmitted by the ME with the verification key information stored by the Ad Hoc hotspot, determining that the ME passes the verification if the key in the key verification request is the same as the verification key information stored by the Ad Hoc hotspot, otherwise determining that the ME does not pass the verification.

5. A method for verifying Mobile Equipment (ME), comprising:
   receiving, by ME, key information from operating company database equipment, acquiring a key from the key information, compiling the key and equipment information of the ME into a key verification request and transmitting the key verification request to an Ad Hoc hotspot; and
   if the ME receives from the Ad Hoc hotspot a notice indicating that the ME passes a verification, establishing, by the ME, a connection with the Ad Hoc hotspot;
   further comprising: after transmitting, by the Ad Hoc hotspot, the corresponding ME information generated according to the equipment information to the operating company database equipment, generating, by the operating company database equipment, the key information and the verification key information according to the corresponding ME information, transmitting the key information to the ME and transmitting the verification key information to the Ad Hoc hotspot.

6. The method according to claim 5, further comprising: before the ME receives the key information from the operating company database equipment, transmitting, by the ME, the equipment information to the Ad Hoc hotspot, and after the Ad Hoc hotspot determines the ME transmitting the equipment information is legal equipment, generating, by the Ad Hoc hotspot, corresponding ME information according to the equipment information and transmitting the corresponding ME information to the operating company database equipment and receiving verification key information returned by the operating company database equipment.

7. The method according to claim 5, further comprising: after transmitting the key verification request to the Ad Hoc hotspot, verifying, by the Ad Hoc hotspot, the ME by utilizing the verification key information after the Ad Hoc hotspot receives the key verification request from the ME, and notifying the ME that the ME passes the verification if the ME passes the verification, and establishing the connection with the ME.

8. A method for verifying Mobile Equipment (ME), comprising:
   generating, by operating company database equipment, key information and verification key information according to ME information transmitted by an Ad Hoc hotspot, transmitting the key information to the ME and transmitting the verification key information to the Ad Hoc hotspot;
   before the operating company database equipment generates the key information and the verification key information according to the ME information transmitted by the Ad Hoc hotspot, generating, by the Ad Hoc hotspot, the ME information according to equipment information and transmitting the ME information to the operating company database equipment after the Ad Hoc hotspot determines that the ME transmitting the equipment information is legal equipment.

9. The method according to claim 8, further comprising: after transmitting the verification key information to the Ad Hoc hotspot, verifying, by the Ad Hoc hotspot, the ME by utilizing the verification key information after the Ad Hoc hotspot receives a key verification request from the ME, and notifying the ME that the ME passes the verification if the ME passes the verification, and establishing a connection with the ME.

10. The method according to claim 8, further comprising: after transmitting the key information to the ME, receiving, by the ME, the key information from the operating company database equipment, acquiring a key from the key information, compiling the key and equipment information of the ME into a key verification request and transmitting the key verification request to the Ad Hoc hotspot; and if the ME receives a notice indicating that the ME passes verification from the Ad Hoc hotspot, establishing, by the ME, a connection with the Ad Hoc hotspot.

11. A system for verifying Mobile Equipment (ME), comprising an Ad Hoc hotspot and operating company database equipment, wherein the Ad Hoc hotspot is configured to, after determining that ME transmitting equipment information is legal equipment, generate corresponding ME information generated according to the equipment information and transmit the corresponding ME information to the operating company database equipment, and receive verification key information returned by the operating company database equipment, and after receiving a key verification request from the ME, verify the ME by utilizing the verification key information, notify the ME that the ME passes the verification if the ME passes the verification and establish a connection with the ME; and the operating company database equipment is configured to generate key information and the verification key information according to the corresponding ME information transmitted by the Ad Hoc hotspot, transmit the key information to the ME and transmit the verification key information to the Ad Hoc hotspot.

12. The system according to claim 11, wherein the Ad Hoc hotspot is specifically configured to extract an operating company logo and/or a manufacturer code from the equipment information as critical information, check whether the critical information is the same as an operating company logo and/or a manufacturer code which are/is stored by the Ad Hoc hotspot, determine that the ME is legal equipment if the critical information is the same as the operating company logo and/or the manufacturer code which are/is stored by the Ad Hoc hotspot, and if the critical information is different from the operating company logo and/or the manufacturer code which are/is stored by the Ad Hoc hotspot, determine that the ME is illegal equipment.

13. The system according to claim 12, wherein the Ad Hoc hotspot is specifically configured to compare a key in the key verification request transmitted by the ME with the verification key information stored by the Ad Hoc hotspot, determine that the ME passes the verification if the key in the key verification request is the same as the verification key information stored by the Ad Hoc hotspot, otherwise determine that the ME does not pass the verification.

14. An Ad Hoc hotspot, comprising a memory storing programming instructions; and a processor configured to be capable of executing the stored programming instructions to perform steps comprising:

after determining that ME transmitting equipment information is legal equipment, generating, by the Ad Hoc hotspot, corresponding ME information according to the equipment information and transmitting the corresponding ME information to operating company database equipment, and receiving verification key information returned by the operating company database equipment; and after receiving a key verification request from the ME, verifying, by the Ad Hoc hotspot, the ME by utilizing the verification key information, notifying the ME that the ME passes the verification if the ME passes the verification and establishing a connection with the ME.

15. An operating company database equipment, comprising a memory storing programming instructions; and a processor configured to be capable of executing the stored programming instructions to perform steps comprising:

receiving ME information from an Ad Hoc hotspot;

generating, by the operating company database equipment, key information and the verification key information according to the corresponding ME information transmitted by the Ad Hoc hotspot, transmitting the key information to the ME and transmitting the verification key information to the Ad Hoc hotspot.

\* \* \* \* \*